(12) United States Patent
Chheda

(10) Patent No.: US 9,177,319 B1
(45) Date of Patent: Nov. 3, 2015

(54) ONTOLOGY BASED CUSTOMER SUPPORT TECHNIQUES

(75) Inventor: Mahendra M. Chheda, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 4 days.

(21) Appl. No.: 13/426,409

(22) Filed: Mar. 21, 2012

(51) Int. Cl.
*G06Q 10/00* (2012.01)
*G06Q 30/00* (2012.01)

(52) U.S. Cl.
CPC .................................. *G06Q 30/016* (2013.01)

(58) Field of Classification Search
CPC ..................................................... G06Q 30/016
USPC ......................................................... 705/304
See application file for complete search history.

(56) References Cited

U.S. PATENT DOCUMENTS

| | | | |
|---|---|---|---|
| 5,895,466 A * | 4/1999 | Goldberg et al. ..................... 1/1 |
| 6,615,240 B1 * | 9/2003 | Sullivan et al. ............... 709/205 |
| 8,271,402 B2 * | 9/2012 | Fisher, Jr. ......................... 706/12 |
| 2003/0101104 A1 * | 5/2003 | Dimitrova et al. ............... 705/27 |
| 2008/0091454 A1 * | 4/2008 | Fisher, Jr. ......................... 705/1 |
| 2010/0246797 A1 * | 9/2010 | Chavez et al. ........... 379/265.02 |
| 2012/0011208 A1 * | 1/2012 | Erhart et al. .................. 709/206 |
| 2012/0102057 A1 * | 4/2012 | Johnston ....................... 707/758 |

OTHER PUBLICATIONS

By Joe Shepley (@joeshepley) How Social CRM Improves the Customer Service Lifecycle Oct. 19, 2010, pp. 1-2.*

* cited by examiner

*Primary Examiner* — Kira Nguyen
(74) *Attorney, Agent, or Firm* — Kilpatrick Townsend & Stockton LLP

(57) ABSTRACT

Methods and systems for providing customer support in response to support communication are disclosed. Such communications may be structured or unstructured, and unstructured communications may be subject to further processing. A determination is made at least as to one or more relevant support classes, as well as to whether further support action(s) should be initiated. When determined that at least a further support action should be initiated, aspects of the support action may be determined and initiated.

24 Claims, 5 Drawing Sheets

ONTOLOGY BASED CUSTOMER SUPPORT TECHNIQUES

BACKGROUND

Customer relationship management (CRM) systems are widely used by business entities to manage disparate aspects of customer interaction. Some of these aspects involve customer communication regarding one or more services provided by a given business entity. However, such communication often occurs in unstructured and/or indirect ways, such as the dissemination of feedback via social media, where the customer may not directly be addressing the service-providing business entity, but rather to the public at large. For example, a customer may air grievances about limited and/or crippled functionality relating to the service via a public Internet forum. Currently, many conventional techniques inadequately address such unstructured and/or indirect customer communications, and as a result, may provide a less than optimal level of support to customers that communicate indirectly.

BRIEF DESCRIPTION OF THE DRAWINGS

Various embodiments in accordance with the present disclosure will be described with reference to the drawings, in which.

DETAILED DESCRIPTION

Figure 1:
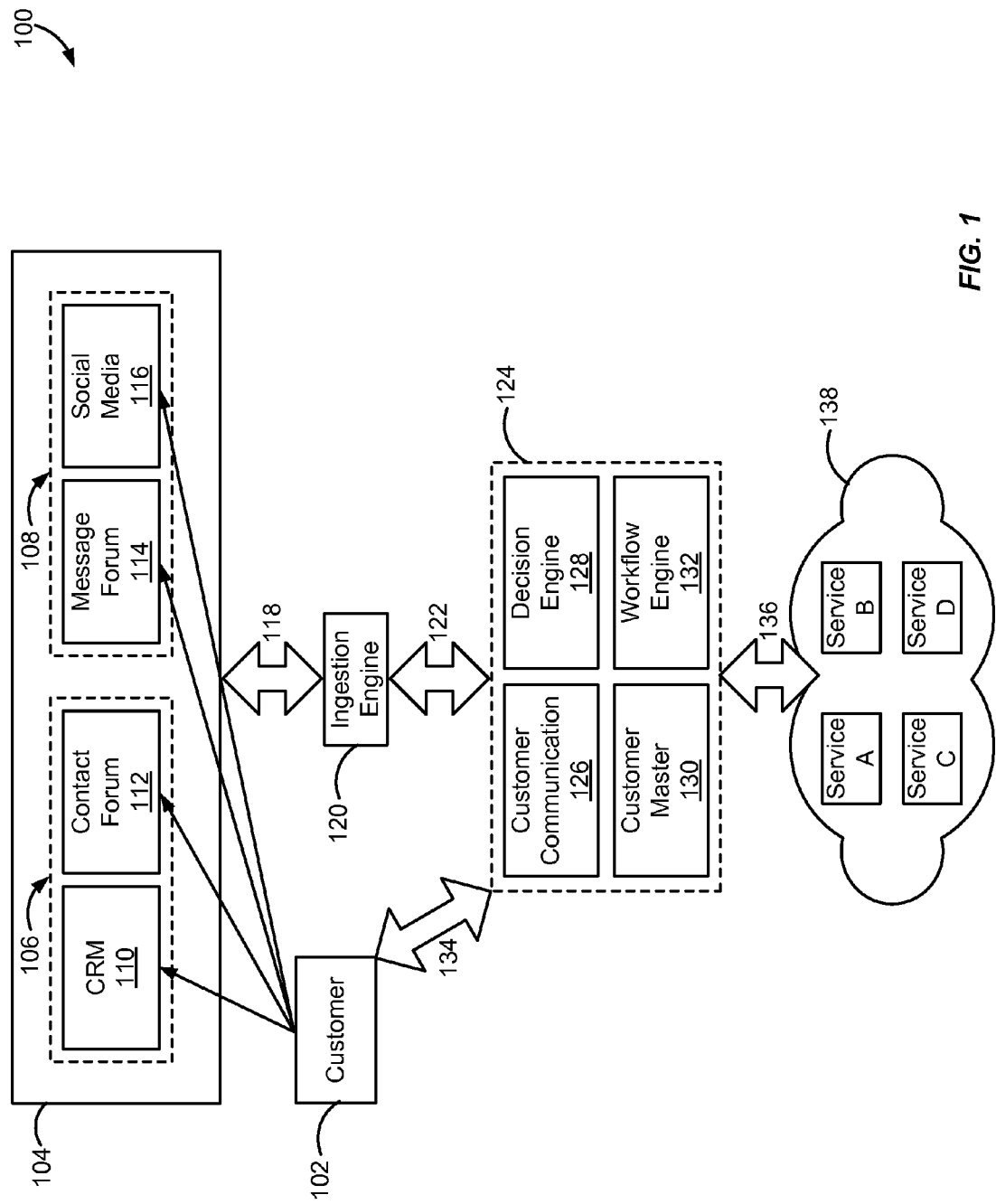
FIG. 1 illustrates an example of an environment that can be used in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to providing support to customers in an electronic environment. In particular, various embodiments provide support services, workflows and techniques for and/or on behalf of customers of computing services provided by a computing resource provider. For example, a customer may directly contact and/or indirectly contact, through a support channel or other appropriate interface, a service provider. In some embodiments, such contacts are analyzed to determine whether support actions are warranted, and if so, what specific service category applies and which specific support actions should be executed. In some embodiments, the customer may be a user or consumer of a computing or other service provided by the computing resource provider, hereinafter referred to as a "service provider." A service provider may provide any number or type of services, including, but not limited to, computing services, storage services or support services, and may expose them to any entity, and in any appropriate manner. Examples include, but are not limited to, exposure to customers, virtual instances of a computing service provided by the service provider, or other services, via application programming interfaces (API), user interfaces (UI), or other appropriate interfaces available to such entities locally or over any network, including the Internet.

In some embodiments, the customer expresses a desire for support through an interface at least curated by or directed to the service owner or provider. Such interfaces generate structured data that is, in some embodiments, directly consumable by at least some aspects of the techniques or entities described herein. The structured data may be data that is formatted into predefined fields of an interface provided by a service owner, service provider, or support entity. In some embodiments, a customer may make a statement about the functionality or operability of a service provided by the service provider, thereby generating unstructured data. In some embodiments, unstructured data comprises statements that may be expressed on social media platforms, freeform messaging forums, blogging sites or other entities on public communication networks such as the Internet, and in some embodiments, may not necessarily directed at the service provider. Such unstructured data may, in some embodiments, trigger or be detected by a listener that is configured to detect specific triggers, such as handles of posting customers, metadata tags or hashtags. Hashtags may include words and/or phrases preceded by a hash character ("#"), and in some embodiments are used to identify a post, message or statement with which the hashtag is attached or otherwise associated. In some embodiments, the unstructured data associated with the trigger is analyzed or processed by one or more data cleansing techniques, including natural language processing techniques, to determine the equivalent structured content of the data. Such techniques may, in some embodiments, by performed by an ingestion entity of the service provider, and such an ingestion entity may also ingest the structured data from the sources curated by the service provider. The ingestion entity may be a computer system entity configured to at least concatenate data from one or more sources, and presents the concatenated data to downstream entities.

In some embodiments, the ingested and/or processed data is passed to an entity or group of entities to determine which supported services and/or service aspects apply to the data. Such services and/or service aspects are, in some embodiments, organized as an ontological hierarchy or tree. In some embodiments, the entity or entities receiving the ingested and/or processed data traverse such an ontological tree to determine which node or nodes (corresponding with services and/or service aspects) apply to the data. Upon determining the associated services, in some embodiments, a decision engine or similar entity makes a determination of whether support action is to be taken, and if so, what support steps should be executed. Such a determination may be informed by characteristics of a customer, the content of the data, the service or services determined to apply to the data, or other factors appropriate to the given determination. An engine, as used herein, may include one or more entities that are configured to perform one or more actions, such as computational actions. For example, a decision engine may comprise one or more entities that are capable of determining at least whether a support action is to be taken, and if so, which actions or steps should be performed. When determined that one or more support actions are to be taken, in some embodiments, a workflow engine or entity at least coordinates the actions such that the customer associated with the data receives the determined support. Such support action(s) may be directly performed by the workflow engine, coordinated by the workflow engine to be executed amongst a plurality of associated entities, or deferred to an entity associated with the services or service aspects determined to apply to the data. Workflows may include a sequence of one or more actions and/or steps that are to be performed in a specific order. Actions and steps may themselves comprise more granular workflows, and thus the execution of a given step in an overall workflow may initiate or "kick off" a separate workflow. In some embodiments, the customer and actions taken by and on behalf of the customer are tracked by a customer master or aspect of a CRM system, and in some embodiments, any workflows or determinations underway may be communicated to, or informed by, the associated customer.

Various other applications, functions, and advantages are presented below with respect to the various embodiments. It should be understood that the description and figures provide a number of examples, but the alternatives and variations possible within the scope of the various embodiments are not fully described. Alternatives and variations, however, would be apparent to one of ordinary skill in the art in light of the teachings and suggestions contained herein.

FIG. 1 illustrates an example of environment 100 for implementing aspects in accordance with various embodiments. In this example, a customer 102 generates support communications 104. Customers are, in some embodiments, end users or other entities that consume or utilize various services provided by a service provider, as previously described. The support communications 104 may be either structured communications 106 or unstructured communications 108. Structured communications are, in some embodiments, communications that are submitted in a manner that is directed to, controlled by, or curated by a support entity. In some embodiments, the support entity is an entity that is at least connected to the service provider. Entities may be aspects implemented on at least devices of one or more computer systems, and in some embodiments, may be virtualized instances of a plurality of networked computer systems in a distributed system. Entities may also include portions or subsets of the implemented aspects, wherein the portion may be separated by functionality or some other appropriate characteristic. In some embodiments, the support entity exposes an interface that is configured to accept customer communications in a predefined format or manner, and thus the content of the communication can be standardized in a fashion conducive to later processing by, for example, an entity implementing an ontology. The ontology may represent knowledge, e.g., the service structure of a service provider or any aspect thereof, as a set of interrelated concepts, e.g., the services and/or aspects thereof being represented as nodes within a hierarchical data tree. Examples of structured communications include contacts to or generated by customer relationship management (CRM) platforms 110, customer communications via support contact forms 112 provided by the support entity, or other appropriate techniques, methods and interfaces. Unstructured communications, in some embodiments, include communications that are not specifically directed to a support entity, but are related to some supported aspect under a service provider's or support entity's purview. For example, a customer may post on an Internet or intranet message forum 114, or communicate to a third party via a social media platform 116, regarding an aspect of a service provided by the service provider and supported by the support entity. Other examples include entries or posts on blogging sites, Internet Relay Chat (IRC) channels, third party question-and-answer sites and the like. Such a communication may, in some embodiments, not specifically be an inquiry to the support entity or service provider for support, but may instead be directed to other users of such forums and/or platforms.

In some embodiments, the support communications are submitted via one or more data connections 118 to an ingestion engine 120. The data connection may be of any suitable kind, including, but not limited to, network connections, local data connections, or Internet connections. In some embodiments, submissions of structured communications may be passed directly to the ingestion engine (and in some embodiments, to entities beyond the ingestion engine) without processing or modification, as in some embodiments, such structured communications are formatted in a standardized way. As will be contemplated, unstructured communications may be freeform and may not necessarily conform to the same predefined format or manner as that of the structured communications. In such embodiments, additional processing to extract data from the unstructured communications may be performed. Such additional processing may, in some embodiments, involve any number of data cleansing and/or language processing techniques including natural language processing techniques, which may in turn include linguistic stemming, determination of word weights, determination of the proximity of certain words, and other applicable techniques. In some embodiments, the data extracted by the processing may contain and/or be formatted to resemble structured communications from curated sources, i.e. that the extracted data conforms to the same ontology as that of the structured communications. In some embodiments, such additional processing may be performed by the ingestion engine itself, or in some embodiments, by another entity prior to ingestion by the ingestion engine. In some embodiments, the presence of unstructured communications may be detected by an associated trigger, such as may be implemented by one or more listening entities. For example, a listening entity may track activity on a message forum or social media platform, and a trigger may be the detection of the use of specific metadata tags, e.g. hashtags, in a post to such a forum or platform. As another example, the trigger may be the detection of a handle known or deduced to be associated with an existing or prospective customer. Upon such a trigger, in some embodiments, the post containing a triggering metadata tag is submitted to the ingestion engine, and as previously described, may be processed to extract data prior to being submitted.

In some embodiments, the ingestion engine submits the ontology-conforming data, via one or more data connections 122, to one or more decision tree entities 124. The data connections may be of any suitable type or implementation, similarly to the data connections 118 previously alluded to. In some embodiments, the decision tree entities collectively determine and drive support actions, based at least in part, on the service and/or service aspects that apply to the incoming data (which, as previously described, are correlated to structured and unstructured customer communications). In some embodiments, as previously alluded to, the service and/or service aspects are organized as interrelated support classes or objects in an ontology tree. In some embodiments, the decision tree entities may include a customer communication engine 126, a decision engine 128, a customer master 130 and/or a workflow engine 132. Such entities are, in some embodiments, interoperable and/or interconnected, and may, individually, collectively or in any part, communicate with the customer via a data connection 134.

In the example given, the customer master 130 stores information about various customers consuming, using and/or otherwise connected to services provided by the service provider (and/or supported by the support entity). The customer master may, in some embodiments, provide to the decision engine information regarding the status or characteristics of the customer associated with the incoming ontology-conforming data. For example, the associated customer may have a premium or high-priority support classification, and thus be entitled to a different and possibly higher level of service. As another example, the associated customer may have had similar problems with similar services or service aspects in the past, and thus be entitled to a higher level of support.

In some embodiments, based on the incoming data, the derived customer information, and other information, the decision engine 128 determines the specific support classes that apply to the data and determines whether support actions should be driven. Support classes may include references to supported services, service aspects or other functional support divisions as appropriate for the given implementation. In some embodiments, the decision engine determines the applicable support classes by applying a decision tree, in some cases an ontology tree as previously described, and deriving the specific issue or issues for which the customer contact was initially created by traversing the decision tree. The decision engine may additionally retrieve, over data connection 136, data such as operational information or health metrics from the services and/or service aspects 138. Based on at least part of the information derived and/or received, the decision engine determines whether one or more support actions should be taken. For example, the decision engine may determine that, based on its assessment that the incoming data describes a customer problem in a given service aspect, that the service aspect has reported an issue, and that the customer is entitled to support, one or more support actions should at least be initiated. Upon determining that the support action(s) should be initiated, the decision engine may also determine the specific sequence and content of support steps to be carried out. Such support steps and/or actions may be performed, either automatically, with manual input, or in any combination, by any appropriate entity including the decision engine itself. In a preferred embodiment, the coordination and/or scheduling of the determined action(s) and/or step(s) is performed by a separate workflow engine 132. In some embodiments, some or all of the actions are deferred to the associated support classes, services and/or service aspects themselves, and instructions for such actions and/or steps are submitted to the services 138 via data connection 136. In some embodiments, the determinations of the decision engine are improved over time by using a feedback loop, e.g., as may be applied in the context of a machine learning technique, wherein the feedback is received from any entity capable of informing the decision engine of its past and present performance. For example, if the decision engine receives an abnormal amount of feedback, e.g., from customers, that decisions to not initiate support actions were incorrect, the decision engine may adjust its operation to more frequently initiate action based on the received feedback. It is contemplated that any aspect of the decision tree entities may communicate with the customer for any appropriate reason, including providing visibility into the determinations and/or actions taken by the various components therein. It is also contemplated that any such customer communication, action(s) taken or determinations made may be associated with the customer as persisted by the customer master, so as to be available for further or future determinations of the decision tree entities.

Figure 2:
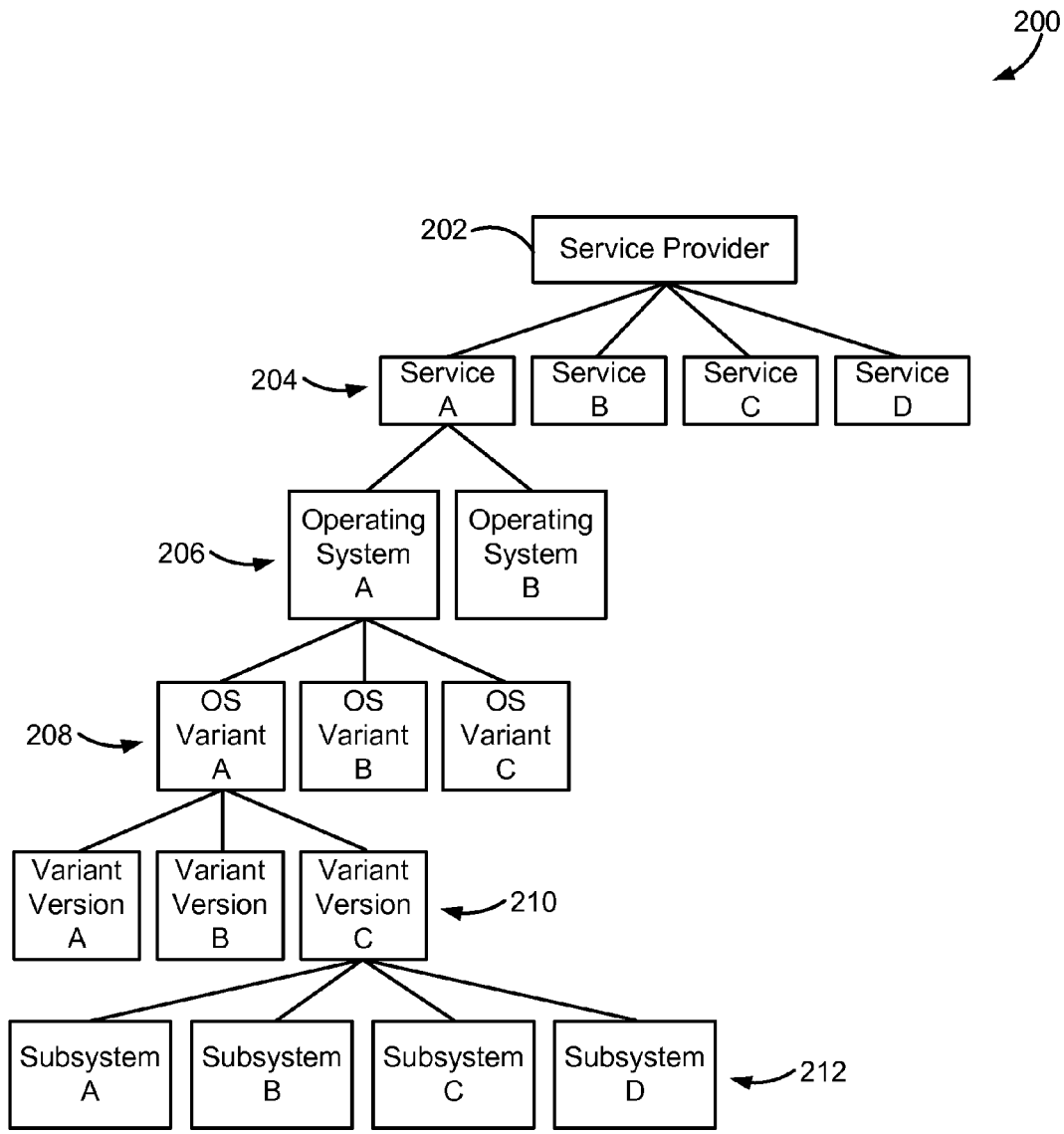
FIG. 2 illustrates an example of an ontology tree that can be used in accordance with at least one embodiment.

FIG. 2 illustrates an example of a decision tree 200 in accordance with various embodiments. As previously described in connection with FIG. 1, and as implemented by the decision tree entities 124 of FIG. 1, the decision tree described herein may be an ontology tree of interrelated support classes and/or objects correlating, at least in some embodiments, to the actual hierarchy of the services and/or service aspects themselves. In the given example, a service provider 202 provides services A through D 204. As depicted in FIG. 2, the service provider is a root node, while the services are child nodes of the service provider. Each child node inherits the characteristics of its parent, and each node represents a support class or object as previously described in connection with FIG. 1. The amount of detail in information provided or derived from the support communications 104 as described in connection with FIG. 1 will, in some embodiments, determine the depth to which the tree is traversed. In the example given, the service provider provides virtualization service A, instances of which may be configured with either of operating systems A or B 206. Operating system A may come in any of variants A through C 208, and the support entity may support versions A through C 210 of operating system variant A. Finally, in this example, subsystems A through C 212 are associated with the terminal nodes of the tree, with version C as their shared parent.

Using the example given, a customer may, for example, create an unstructured message forum post that, using the techniques described in connection with FIG. 1, is interpreted as a customer issue with an instance of service A, running operating system A, but no further level of detail can initially be determined. In an embodiment, the decision engine of FIG. 1 may determine that, based on a traversal of known issues related to operating system (OS) A and service A, insufficient information exists to carry out any substantive support steps and thus initiate a communication to the associated customer for more information, e.g. that which identifies the specific instance at issue or further empirical information such as the OS variant used, the version used, and/or the subsystem affected. Upon receiving the requested information, the decision engine may assess that, for example, non-functional subsystem C of the customer's instance is as a result of a configuration problem that can be fixed by simply restarting the instance, and thus performs the restart. In alternative embodiments, incomplete ingested information, as may be the case particularly when receiving and processing unstructured communications, may be complete enough to accurately infer further details about the specific service classes or objects involved. For example, the support communication may only indicate that an instance running variant version C is having a problem with subsystem A. A decision engine, or other entity or entities implementing the decision tree, may perform a traversal of the tree to determine the missing information. In the example given, the decision engine may determine that the only possible combination of variant version C and subsystem A is an instance of service A, running OS variant A of operating system A, and thus perform further determinations using a more complete data set than was initially provided, without the need for further input.

In some embodiments, ingested data may be associable with service classes and/or objects in multiple and/or disparate subtrees. For example, the data may map to an issue with aspects of services A, C and D. To determine the most appropriate support class or object(s), a decision tree-implementing entity may take into account other characteristics of the ingested data, such as the weight of specific keywords within the data, as well as information regarding the proximity of certain words and/or keywords with one another. For example, given the assumption that keywords "lost," "instance" and "volume" carry the most weight, an unstructured communication that reads "we lost access to this instance again; I was unable to complete the data migration to a volume" may be interpreted differently than one that reads "my instance runs just fine, but I keep on getting this message saying that my volume was lost." Since, in the first example, the keywords "lost" and "instance" are considerably closer in proximity than "lost" and "volume," an implementing entity may deduce that the described issue is more closely related to a problem with, e.g., an instance of a service, rather than a problem with a volume. Conversely, in the second example, the keywords "lost" and "volume" are closer together than "lost" and "instance," and the implementing entity may determine that a service class and/or object pertaining to lost volumes is the best appropriate match. The examples given are not meant to be limiting in any way, but merely exemplary of the flexibility of such a decision tree, as well as that of the implementation thereof.

Figure 3:
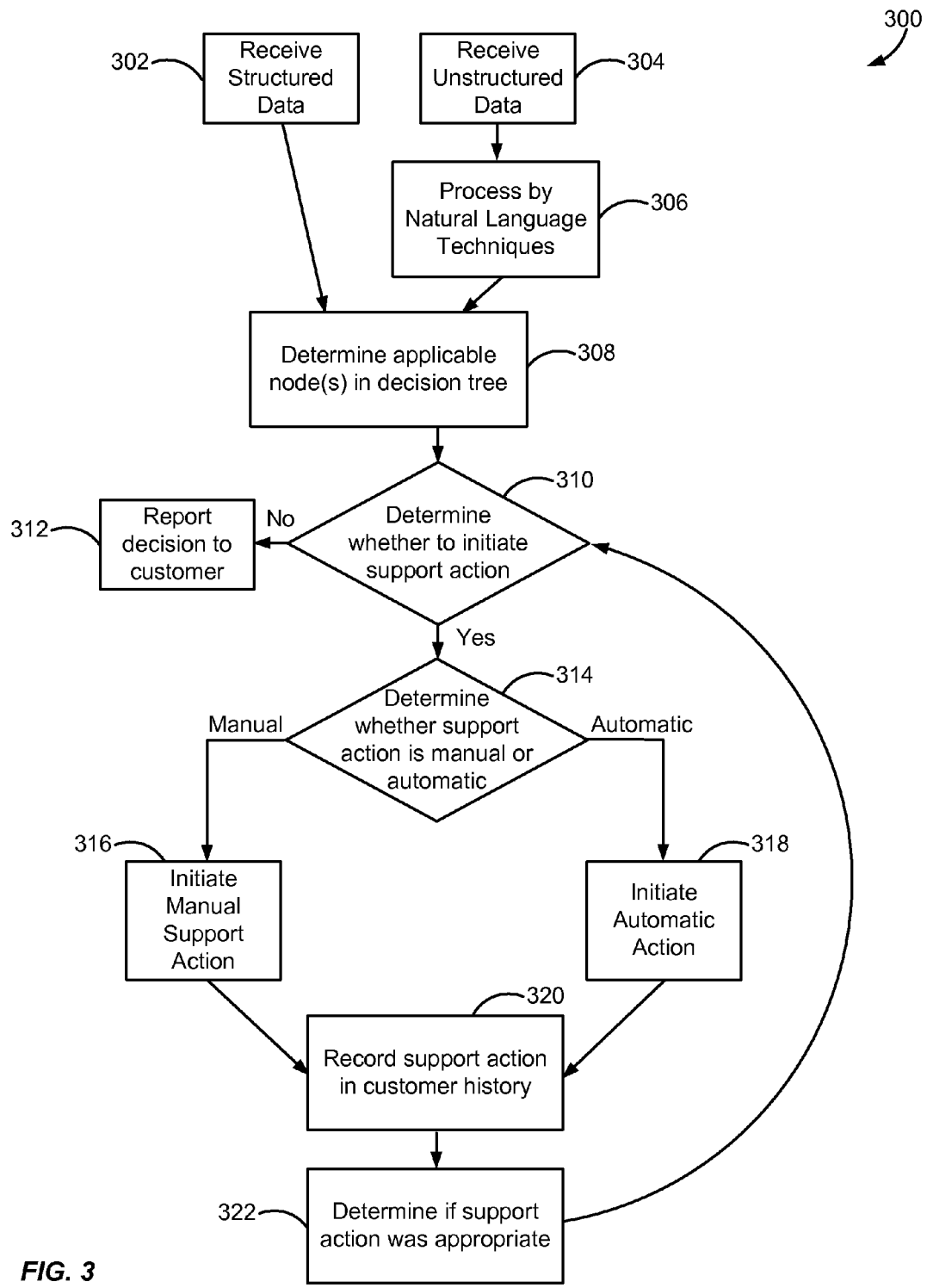
FIG. 3 illustrates an example of a process for customer support, in accordance with at least one embodiment.

FIG. 3 is an example process 300 for providing customer support, in accordance with some embodiments. Some or all of the steps in process 300 (or any other processes described herein, or variations and/or combinations thereof) may be performed by any combination of entities and techniques, such as those described at least in connection with FIGS. 1 and 2. Some or all of the process 300 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In the illustrated example, one or more entities, for example, the listeners, interfaces, presences and/or ingestion entities described in connection with at least FIG. 1, receive structured data 302 and/or unstructured data 304. As previously described in connection with at least FIG. 1, the structured data may be constructed or formatted in a predetermined manner, for example, to facilitate later processing (e.g., for processing by a decision engine or similar entity). Unstructured data may be processed by any number of data cleansing techniques 306, including natural language processing techniques. As described in connection with at least FIGS. 1 and 2, such as linguistic stemming, determination of word weights, determination of the proximity of certain words, and other applicable techniques. The output of such processing may, as previously described, be analogous in form to that of structured data.

Both the structured data and the processed unstructured data are processed to determine an applicable node or node(s) within a decision tree 308. As described in connection with at least FIG. 2, such a decision tree may be an ontology tree with a structure that is at least analogous to the ontological structure of one or more supported services and/or service aspects themselves. Also as previously described, when more than one subtree or node in the tree applies to the data, the most appropriate node or nodes may be selected by using data about the relationship between various elements of the data, such as proximity of keywords or keyword weights. The determination at step 308 may be performed by any appropriate entity, such as the decision engine 128 of FIG. 1.

Upon determination of the services and/or service aspects applicable and/or associated with the data, a decision is made as to whether to initiate one or more support actions 310. Such a determination may be made by any appropriate entity, such as the decision engine 128 of FIG. 1, and may be informed by other data, such as information about the customer via a customer master 130, or from information derived from feedback, also as described in connection with FIG. 1. If determined at step 310 that no action is possible or necessary, an entity, such as the customer communication engine 126 of FIG. 1, may communicate to the customer 312 that no support action will be initiated. Alternatively, the system may simply remain silent. Such a decision may, in some embodiments, be noted in a customer's history, e.g., as persisted by the customer master 130 described in connection with FIG. 1.

However, if a support action is determined to be necessary at step 310, a further determination of the support steps necessary is made 314. The determination of step 314 may be performed by any appropriate entity, such as the decision engine 128 described in connection with FIG. 1, and may comprise any combination of manual 316 or automatic 318 steps and/or actions. It is contemplated that a support action may include a determination that further customer information is necessary before substantial support steps may be taken, in which case an entity, such as a customer communication engine, may solicit such further information directly from the customer. Manual actions initiated at step 316 may be initiated and/or executed in any appropriate fashion, with some embodiments incorporating certain automatic actions that subsequently initiated manual actions. Examples include the automatic creation of a trouble ticket within an existing trouble ticketing system, a direct notification to a technician or support specialist, or the contacting of a customer for additional information as previously described. Automatic actions initiated at step 318 may, as described in connection with FIG. 1, be executed by any appropriate entity, including, but not limited to, the decision engine, a workflow engine or an entity connected with the relevant service or service aspect.

Initiated and/or completed actions, including their respective outcomes and/or operational details in some embodiments, may be recorded in a customer history 320 that is, for example, persisted by a customer master 130 as described in connection with FIG. 1. It will be appreciated that such information may influence later determinations by, e.g., the decision engine, in embodiments where the determining entity queries the customer master for customer information, and uses such customer information to assist in the determination. Additional feedback for the determining entity, e.g. the decision engine, may be derived by an ex post determination as to whether the support action(s) taken, or the decision whether to take support action(s) at all, was appropriate 322. As previously described in connection with FIG. 1, the appropriateness of such decisions may be determined from the reference of any appropriate entity or entities, such as that of customer (s), the supported services and/or service aspects, or other entities implementing and/or implemented by the systems and/or processes described herein. Such information may be reported to and accumulated by an entity responsible for any determining step, e.g. steps 308, 310 and/or 314, although feedback into the determination of whether to support action at step 310 is shown merely for clarity of example.

Figure 4:
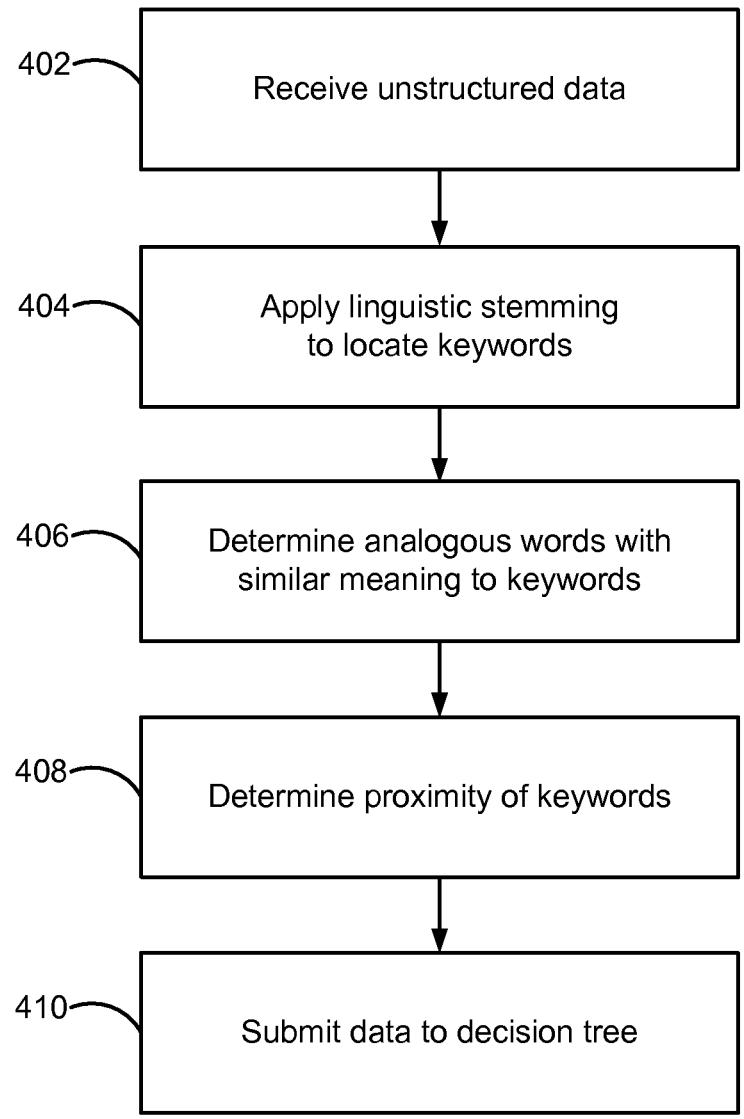
FIG. 4 illustrates an example of a process for parsing support data, in accordance with at least one embodiment.

FIG. 4 illustrates an example process 400 for parsing data in accordance with some embodiments. As previously mentioned at least in connection with FIGS. 1, 2 and 3, entities such as the previously described decision engine and/or ingestion engine may apply one or more data cleansing techniques, such as natural language processing techniques, to parse and otherwise derive desired data from unstructured data. As previously alluded to, the derived data may, after processing, conform to a similar format and/or content to that of structured data. The illustrated process 400 provides but one example of techniques to parse unstructured data, e.g. as would be used as part of the systems, methods and processes heretofore described. Other techniques or combinations of techniques may be used.

An entity receives unstructured data 402 by any appropriate mechanism, such as via a listener as described in connection with at least FIGS. 1 and 3. As previously described, such unstructured data may, in some embodiments, be or derive from customer communications on social media platforms or public message forums, and may not necessarily be directed toward an entity implementing the process 400. As described in connection with FIG. 1, in embodiments where a listener is used, the usage, by a customer posting the communications, of various metadata tags (such as hashtags), may trigger the listener to submit the associated communication to the receiving entity. The receiving entity may, as previously noted, be any appropriate entity, such as the ingestion engine 120 of FIG. 1.

Upon receiving unstructured data, linguistic stemming is applied to locate certain keywords 404. Stemming algorithms may, for example, reduce various words to their roots to facilitate later processing. For example, a stemming algorithm may reduce words ending in "-ed," "-ing," "-ly," or "-s" by removing such suffixes. Analogously, an adaptive algorithm may be employed that takes into account irregularities in inflecting or conjugating certain words. Thus, "crashed" may be reduced to "crash," and in some embodiments, "ran" may be reduced to "run."

An implementing entity further processes the data received at step 402 by determining analogous words 406 in the received data to those, for example, predetermined by an ontology such as that described in connection with at least FIG. 2. For example, if predetermined keywords include the phrase "auto insurance," data including the phrase "car insurance" may be construed to contain the keyword "auto insurance." The determination may rely on either a static technique, such as the use of a predefined thesaurus, or a dynamic and/or adaptive technique, wherein the entity continuously learns, through feedback, the relationship between various words with similar meanings. It is contemplated that such a technique may be configurable to recognize any number of words or length of phrase, depending on the specific need.

Once the keywords in the incoming data have been determined according to steps 404 and 406, the proximity and/or weights of the determined keywords within the data are assessed 408. Certain keywords may be given a stronger correlative weight to, for example, a given node of an ontology tree. For example, the word "instance" may have a strong correlation to a node corresponding to a service that provides virtualized instances, while the word "down" may not have a similar weight. The proximity of keywords may also be used to further define their significance. For example, the phrase "the instance is down" may contain two keywords, "instance" and "down," in close proximity, which indicates a correlation between them. Further processing, for example by the decision tree 200 of FIG. 2, may take this correlation into account and determine that a virtual instance of a service has failed. By contrast, the phrase "the instance has several attached volumes that all went down" may be interpreted as placing the keywords "instance" and "down" far apart, and thus not closely correlated. However, "volumes" and "down" are in relative proximity, and further processing may result in a determination that the attached volumes, and not the instances, have failed.

Once the data has been processed according to steps 404, 406 and 408, the processed data is submitted to an entity or entities with determinative knowledge 410, for example the decision tree 200 of FIG. 2, or implementing entities 124 thereof as described in connection with FIG. 1. As previously mentioned, the data submitted at step 410 may be used in a fashion similar to structured data also received by, for example, the decision tree or implementing entities. In some embodiments, the techniques described at least in connection with FIGS. 1, 2 and 3 may be used for further processing and/or determination.

Figure 5:
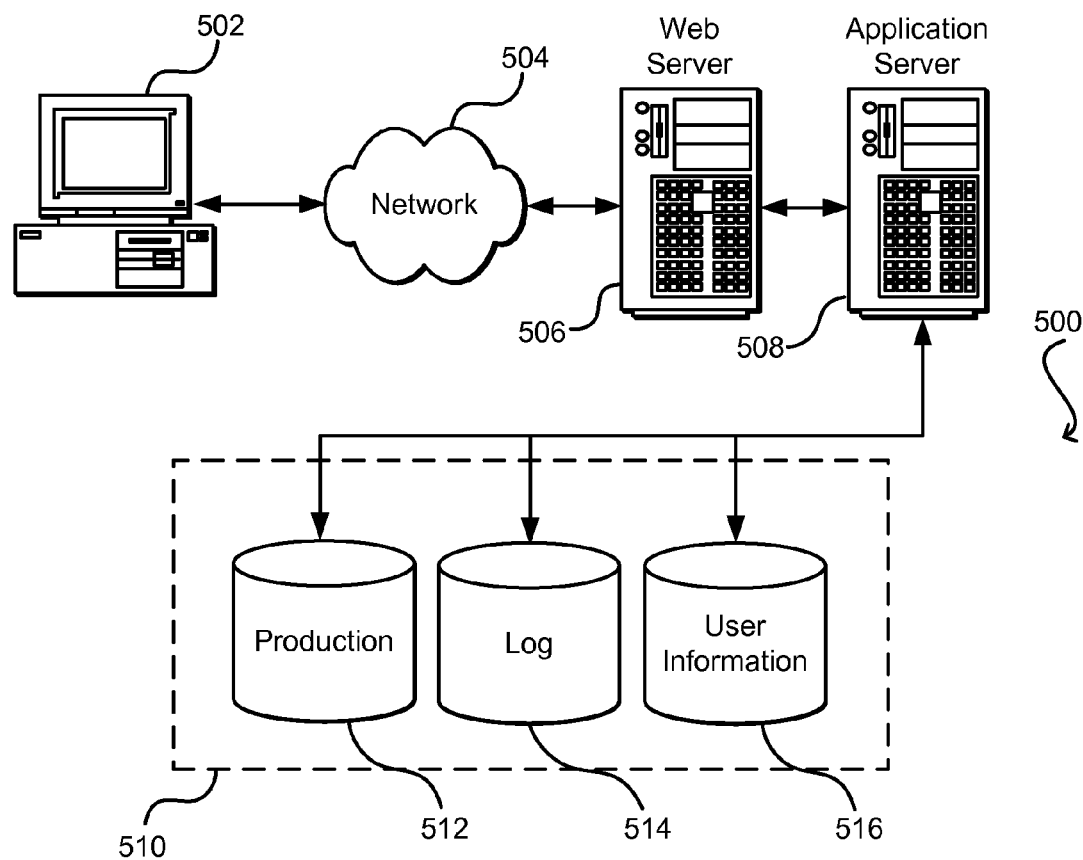
FIG. 5 illustrates an environment in which various embodiments can be implemented.

FIG. 5 illustrates aspects of an example environment 500 for implementing aspects in accordance with various embodiments. As will be appreciated, although a Web-based environment is used for purposes of explanation, different environments may be used, as appropriate, to implement various embodiments. The environment includes an electronic client device 502, which can include any appropriate device operable to send and receive requests, messages, or information over an appropriate network 504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 506 for receiving requests and serving content in response thereto, although for other networks an alternative device serving a similar purpose could be used as would be apparent to one of ordinary skill in the art.

The illustrative environment includes at least one application server 508 and a data store 510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 502 and the application server 508, can be handled by the Web server. It should be understood that the Web and application servers are not required and are merely example components, as structured code discussed herein can be executed on any appropriate device or host machine as discussed elsewhere herein.

The data store 510 can include several separate data tables, databases, or other data storage mechanisms and media for storing data relating to a particular aspect. For example, the data store illustrated includes mechanisms for storing production data 512 and user information 516, which can be used to serve content for the production side. The data store also is shown to include a mechanism for storing log data 514, which can be used for reporting, analysis, or other such purposes. It should be understood that there can be many other aspects that may need to be stored in the data store, such as for page image information and to access right information, which can be stored in any of the above-listed mechanisms as appropriate or in additional mechanisms in the data store 510. The data store 510 is operable, through logic associated therewith, to receive instructions from the application server 508 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 502. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 500 in FIG. 5 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for processing customer communications, comprising:
   generating, by a computer system, a tree associated with services of a resource provider, nodes of the tree indicative of the services and associated support classes of the resource provider, the services offered to a plurality of customers based at least in part on device configurations of the resource provider remotely usable by the plurality of customers;
   obtaining, by the computer system, a plurality of structured customer communications over a period of time, a structured customer communication of the plurality of structured customer communications formatted based at least in part on a predefined field of an interface, by at least:
      (a) receiving the structured customer communication that is at least directed, by a customer of the plurality of customers of the resource provider, to a support entity that is configured to receive the structured customer communication; and
      (b) upon detection of a trigger indicating communication between the customer and a third party, at least:
         (i) receiving an unstructured customer communication based at least in part on the trigger, the unstructured customer communication including a free-form communication; and
         (ii) processing the received unstructured customer communication to generate the structured customer communication;
   inferring, by the computer system, customer information indicating a potential device configuration of the resource provider associated with the obtained plurality of structured customer communications, the inferring comprising:
      (a) comparing customer data from the generated structured customer communication to resource provider data within the nodes of the tree;
      (b) identifying a node of the tree as representing a potential service provided to the customer based at least in part on the comparing; and
      (c) identifying the potential device configuration based at least in part on the potential service;
   setting a device configuration remotely utilized by the customer from the device configurations of the resource provider as the potential device configuration based at least in part on analyzing the obtained plurality of structured customer communications and the inferred customer information;
   determining one or more support classes that are relevant to the analyzed obtained plurality of structured customer communications based at least in part on the device configuration and the node representing the potential service;
   determining whether to initiate support workflows relevant to the determined one or more support classes; and
   based at least in part on determining that the support workflows should be initiated:
      (a) determining, using at least the analyzed plurality of structured customer communications, appropriate workflow sequences for the support workflows; and
      (b) executing the determined appropriate workflow sequences; and (c) notifying the customer of the executed workflow sequence.

2. The computer-implemented method of claim 1, wherein the trigger is detected by a listener computer system that is configured to track use, on public communications network presences, of handles or metadata tags, the handles including at least identities associated with the customer, the metadata tags including at least hashtags.

3. The computer-implemented method of claim 1, wherein the detected trigger is detected use of at least one metadata tag among a plurality of predetermined triggering metadata tags.

4. The computer-implemented method of claim 1, wherein the received unstructured customer communication is processed by applying at least one natural language processing technique.

5. The computer-implemented method of claim 1,
wherein the inferred information indicating the potential device configuration utilized is based at least in part on querying a customer master computer system that at least stores information about the customer.

6. A computer-implemented method for processing customer communications, comprising:
generating a tree associated with services of a resource provider, nodes of the tree representative of the services and associated support classes of the resource provider, the services offered to a plurality customers based at least in part on device configurations of the resource provider remotely usable by the plurality of customers;
upon detection of a trigger indicating communication between a customer of the plurality of customers of the resource provider and a third party, at least:
(a) receiving, by a computer system, an unstructured communication relating to a support class based at least in part on the detection of the trigger, the support class associated with a service of the services of the resource provider; and
(b) processing the received unstructured communication to generate a structured communication;
inferring, by the computer system, customer information indicating a potential device configuration of the resource provider based at least in part on the generated structured communication, the inferring comprising:
(a) comparing customer data from the generated structured communication to resource provider data within the nodes of the tree;
(b) identifying a node of the tree as representing a potential service provided to the customer based at least in part on the comparing; and
(c) identifying the potential device configuration based at least in part on the potential service;
setting a device configuration remotely utilized by the customer from the device configurations of the resource provider as the potential device configuration based at least in part on analyzing the generated structured communication and the inferred customer information;
determining the support class that relates to the received unstructured communication based at least in part on the device configuration and the node representing the potential service;
determining whether to initiate a support workflow relevant to the support class based at least in part on determining the support class; and
based at least in part on determining that the support workflow should be initiated, at least:
(a) determining, using at least the analyzed structured communication, an appropriate workflow sequence for the support workflow; and (b) executing the determined appropriate workflow sequence.

7. The computer-implemented method of claim 6, wherein the determination of whether to initiate the support workflow further includes at least an analysis of the inferred customer information and wherein the determination of the appropriate workflow sequence further includes at least an analysis of the inferred customer information.

8. The computer-implemented method of claim 7, wherein the customer information is inferred by querying a customer master entity that stores the customer information for a plurality of customers, and further comprising submitting information at least relating to the executed workflow sequence to the customer master entity, such that the workflow sequence-related information is correlated with the associated customer by the customer master entity.

9. The computer-implemented method of claim 6, wherein the determined support class is selected, based on the analysis of the structured communication, from among a plurality of support classes organized into the tree.

10. The computer-implemented method of claim 6, wherein the determination of whether to initiate the support workflow is further determined by analyzing outcomes of past determinations of whether to initiate support workflows.

11. A computer system for processing customer communications, comprising:
one or more processors; and
memory, including instructions executable by the one or more processors to cause the computer system to at least:
generate a tree associated with services of a resource provider, nodes of the tree representative of the services and associated support categories of the resource provider, the services offered to a plurality of customers based at least in part on device configurations of the resource provider remotely usable by the plurality of customers;
detect triggers that indicate an existence of a freeform communication of a customer of the plurality of customers of the resource provider with a third party provider relevant to a support entity;
upon detecting a trigger of the triggers that indicates a communication between a customer of the resource provider and the third party provider, process the freeform communication, by at least applying at least one data cleansing technique, to generate support data;
infer information indicating a potential device configuration of the resource provider associated with the generated support data, the inference causing the computer system to at least:
(a) compare customer data from the generated support data to resource provider data from the nodes of the tree;
(b) identify a node of the tree as representing a potential service provided to the customer based at least in part on the compare; and
(c) identify the potential device configuration based at least in part on the potential service;
set a device configuration remotely utilized by the customer from the device configurations of the resource provider as the potential device configuration based at least in part on analyze an analysis of the generated support data and the inferred information;
determine a support category related to the generated support data based at least in part on the device configuration and the node representing the potential service;

determine whether to initiate a support action based at least in part on the support category; and
based at least in part on determining that the support action should be initiated, at least:
(a) analyze the generated support data to define the support action; and
(b) perform the defined support action.

12. The computer system of claim 11, wherein the instructions further cause the computer system to provide, to the customer, information related to at least one of the generated support data or the support action.

13. The computer system of claim 11, wherein the instructions further cause the computer system to at least perform the defined support action by submitting information related to the defined support action to an entity associated with the determined support category.

14. The computer system of claim 13, wherein the instructions further cause the computer system to receive, from the entity associated with the determined support category, data related to the performed support action.

15. The computer system of claim 14, wherein the instructions further cause the computer system to provide, to the customer, data related to the performed support action.

16. The computer system of claim 13, wherein the performed support action is a response, to the customer, indicating at least operational metrics of the determined support category.

17. One or more non-transitory computer-readable storage media having collectively stored thereon executable instructions that, when executed by one or more processors of a computing resource provider's computer system, cause the computer system to at least:
generate a tree associated with services of a resource provider, nodes of the tree representative of the services and associated support categories of the resource provider, the services offered to a plurality of customers based at least in part on resource configurations of the resource provider remotely usable by the plurality of customers;
receive information from a customer of the plurality of customers of the resource provider that relates to a support category based at least in part on detecting a trigger indicating communication of the customer with a third party;
infer information indicating a potential resource configuration of the resource provider, the inference comprising:
(a) comparing customer data associated with the received information to resource provider data from the nodes of the tree;
(b) identifying a node of the tree as representing a potential service provided to the customer based at least in part on the comparing; and
(c) identifying the potential resource configuration based at least in part on the potential service;
set a resource configuration remotely utilized by the customer from the resource configurations of the resource provider as the potential resource configuration based at least in part on analyzing the received information from the customer and the inferred information;
determine the support category related to the received information from the customer based at least in part on the resource configuration and the node representing the potential service;
determine whether the received information from the customer relates to customer support needs that are related to the determined support category;
based at least in part on determining that the received information from the customer relates to customer support needs, determine whether the customer support needs necessitate support action sequences that are at least related to the support category; and
based at least in part on determining that the customer support needs necessitate the support action sequences, at least:
(a) determine support steps of the support action sequences; and
(b) execute the support steps.

18. The computer-readable storage media of claim 17, wherein the determined support steps are, at least in part, automatically executed by an entity of the computer system.

19. The computer-readable storage media of claim 17, wherein the determined support steps are, at least in part, executed by entities related to the support categories.

20. The computer-readable storage media of claim 17, wherein the received information from a customer is submitted by a listener computer system associated with a public communications network presence.

21. The computer-implemented method of claim 1, wherein the inferred information indicating a resource configuration utilized by the customer is different than the information in the obtained structured customer communications and/or the one or more support classes.

22. The computer-implemented method of claim 1, further comprises, at a time after determining that the support workflows should be initiated, scheduling the determined workflow sequences.

23. The computer-implemented method of claim 1, wherein the appropriate workflow sequence comprises a number of device commands to be executed on a resource provided by the resource provider.

24. The computer-implemented method of claim 6, wherein processing the unstructured communication comprises applying one or more of linguistic stemming, determination of word weights, or determination of word proximities to generate the structured communication according to a format for traversing the tree, and wherein determining the device configuration utilized by the customer comprises selecting a node from the one or more nodes based at least in part on a relationship between the customer data from the generated structured communication.

* * * * *